(12) United States Patent
Kilgard

(10) Patent No.: US 7,843,463 B1
(45) Date of Patent: Nov. 30, 2010

(54) SYSTEM AND METHOD FOR BUMP MAPPING SETUP

(75) Inventor: Mark J. Kilgard, Austin, TX (US)

(73) Assignee: NVIDIA Corporation, Santa Clara, CA (US)

(*) Notice: Subject to any disclaimer, the term of this patent is extended or adjusted under 35 U.S.C. 154(b) by 672 days.

(21) Appl. No.: 11/860,478

(22) Filed: Sep. 24, 2007

Related U.S. Application Data

(60) Provisional application No. 60/941,606, filed on Jun. 1, 2007.

(51) Int. Cl.
- G06T 15/20 (2006.01)
- G09G 5/00 (2006.01)
- G06K 9/40 (2006.01)
- G06K 9/36 (2006.01)
- G06K 9/32 (2006.01)
- G06K 9/54 (2006.01)

(52) U.S. Cl. ............... 345/584; 345/582; 345/427; 345/581; 345/606; 382/274; 382/285; 382/300; 382/303

(58) Field of Classification Search ......... 345/418–420, 345/427–428, 581–586, 606, 501, 552; 382/254, 382/274, 285, 300, 303, 305
See application file for complete search history.

(56) References Cited

U.S. PATENT DOCUMENTS

| | | | |
|---|---|---|---|
| 7,474,308 B2 * | 1/2009 | Deering | 345/419 |
| 2004/0196285 A1 * | 10/2004 | Rice et al. | 345/423 |
| 2004/0207622 A1 * | 10/2004 | Deering et al. | 345/426 |
| 2005/0195210 A1 * | 9/2005 | Demers et al. | 345/584 |

* cited by examiner

*Primary Examiner*—Wesner Sajous
(74) *Attorney, Agent, or Firm*—Patterson & Sheridan, LLP

(57) ABSTRACT

One embodiment of the present invention sets forth a technique to setup efficient bump mapping using a geometry shader. This approach uses a vertex shader, a primitive assembly unit, and a geometry shader. The vertex shader performs vertex operations, such as calculating a per-vertex normal vector, and emits vertex data. The primitive assembly unit processes the vertex data and constructs primitives. Each primitive includes a series of one or more vertices, each of which may be shared amongst multiple primitives, and state information defining the primitive. The geometry shader processes each primitive, calculating an object-space to texture-space mapping for each vertex of the primitive and, subsequently, using this mapping to transform the object-space view vector and the object-space light vectors associated with each vertex of the primitive to texture-space equivalents. Advantageously, this approach to setting up bump mapping fully utilizes the GPU, thereby optimizing both hardware resources and performance.

21 Claims, 6 Drawing Sheets

SYSTEM AND METHOD FOR BUMP MAPPING SETUP

CROSS-REFERENCE TO RELATED APPLICATIONS

This application claims the priority benefit of the United States provisional patent application having Ser. No. 60/941,606 and filed on Jun. 1, 2007. The subject matter of this provisional patent application is hereby incorporated herein by reference.

BACKGROUND OF THE INVENTION

1. Field of the Invention

The present invention relates generally to the field of graphics processing and more specifically to a system and method for bump mapping setup.

2. Description of the Related Art

A typical computing system includes a central processing unit (CPU) and a graphics processing unit (GPU). Some GPUs are capable of very high performance using a relatively large number of small, parallel execution threads on dedicated programmable hardware processing units. The specialized design of such GPUs usually allows these GPUs to perform certain tasks, such as rendering 3-D scenes, much faster than a CPU. However, the specialized design of these GPUs also limits the types of tasks that the GPU can perform. The CPU is typically a more general-purpose processing unit and therefore can perform most tasks. Consequently, the CPU usually executes the overall structure of the software application and configures the GPU to perform specific tasks in the graphics pipeline (the collection of processing steps performed to transform 3-D images into 2-D images).

One task that may be performed when transforming 3-D scenes into 2-D images is bump mapping. As is well-known, bump mapping is a rendering approach for simulating lighting effects caused by surface irregularities, such as bumps, wrinkles, and divots. For example, a golf ball may have dimples, which we visually perceive because of the way that light interacts with the surface of the golf ball. Although such surface irregularities may be modeled as geometries in the graphics model of a given object, such a graphics model would be very complex and time-consuming to process and display. Furthermore, some surface irregularities may be smaller than the size of a pixel and therefore the corresponding geometry could not be accurately rendered by the GPU. To address these issues, the object may instead be modeled using simpler geometries to convey the overall shape of the object, and any surface irregularities may be captured as texture maps. Bump mapping techniques use such texture maps in conjunction with the geometries of the object to simulate the lighting effects of the surface irregularities, thereby improving the realism of the graphics image of the object.

One approach to bump mapping divides the bump mapping process into two tasks. The first task is to generate a perturbed surface normal map representing the texture of an object. In this approach, each normal in the perturbed surface normal map may be a direction vector that points up and away from the surface. Typically, the normal (0, 0, 1) represents a flat surface, and any surface variation, such as a dimple, is represented by a normal with a corresponding tilt. The perturbed surface normal map is often generated in a coordinate system called the texture-space.

The second task in the bump mapping process is to perform lighting calculations using the perturbed surface normal map to render and illuminate the object. One approach to this task performs the lighting calculations using the dot product of each of the light vectors and view vectors of each of the pixels of the geometries of the object with the perturbed surface normal map. However, to calculate the dot product, the light vectors and view vectors must share a consistent coordinate system with the normal map. The light vectors and view vectors are typically defined in another coordinate system, such as the object-space. Therefore, bump mapping programs often construct an object-space to texture-space mapping to transform the object-space light vectors and view vectors to texture-space equivalents. Once the light vectors and view vectors are defined in texture-space, the lighting calculations are performed, and the object may be rendered with the texture data.

To create realistic lighting effects, the object-space to texture-space mapping is constructed for each vertex of a given primitive. Both information specific to a graphics primitive, such as a triangle, and information specific to a particular vertex in a graphics primitive, such as the vertex encompassing the upper-left point in a triangle, may be used to create the object-space to texture-space mapping. For example, the object-space to texture-space mapping may include three normalized vectors—the per-primitive tangent vector, the per-vertex normal (the mean of the surface normals of all the primitives that share the particular vertex), and the cross-product of the tangent vector and the per-vertex normal. Furthermore, the object-space to texture-space mapping is dynamic—as the object represented in object-space animates or morphs, the object-space to texture space mapping also changes.

In one approach to bump mapping, the CPU is used to calculate the object-space to texture-space mapping. Since the object-space to texture-space mapping may be different for each primitive, the CPU constructs individual primitives consisting of vertices that are unique to each primitive. One drawback to this approach is that the CPU has to replicate each vertex shared by two or more different primitives in order to construct the individual primitives. Replicating data in such a fashion is inefficient. Furthermore, since the CPU constructs the primitives and calculates the object-space to texture-space mapping, the vertices must be available to the CPU. Therefore, in this approach, the CPU is usually used to perform the vertex processing tasks, in addition to the object-space to texture-space mapping, to avoid having to pass vertex data from the vertex shader in the GPU to the CPU. Since the CPU performs vertex processing tasks much less efficiently than the vertex shader, the capabilities of the vertex shader in this approach are oftentimes not properly leveraged. As indicated, this problem can be addressed by using the vertex shader to perform the vertex processing tasks, but such a solution would require the vertices to be passed from the vertex shader back to the CPU and, therefore, would not necessarily improve the overall efficiency of the bump mapping setup.

As the foregoing illustrates, what is needed in the art is a more effective technique for bump mapping setup.

SUMMARY OF THE INVENTION

One embodiment of the present invention sets forth a geometry processing engine for processing primitives in a graphics rendering pipeline. The geometry processing unit is configured to receive vertex data related to each vertex of a primitive, compute a first vector based on at least a portion of the vertex data to generate an object-space to texture-space mapping for the primitive, and transform a second vector associated with one of the vertices of the primitive from an object-space representation to a texture-space representation by transforming the object space representation by the object-space to texture-space mapping. The object-space to texture-space mapping is typically represented as a three-by-three orthonormal matrix when 3-D vectors are involved, so the texture-space vector is computed by multiplying the matrix by the object-space vector.

One advantage of the disclosed geometry processing engine is that using the geometry shader to perform coordinate space transformations is more efficient than using the CPU for such purposes. Objects are typically represented as a mesh of vertices. Vertices can be shared by multiple primitives in the mesh. Bump map setup computes vertex attributes dependent on each assembled primitive. So if bump mapping setup is performed on the CPU, mesh vertices can no longer be shared by multiple primitives. Instead a per-primitive instance of each vertex must be transferred and processed. This generates substantially more vertices to be transferred and processed compared to performing the bump mapping setup with a geometry processing engine subsequent to vertex processing. Furthermore, the disclosed approach implements the vertex shader for vertex shading operations, thereby more fully exploiting the processing efficiencies of the graphics rendering pipeline. Moreover, since the foregoing operations are executed completely by the GPU, there is no need to send data to the CPU, as with prior art approaches, further increasing overall processing efficiency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
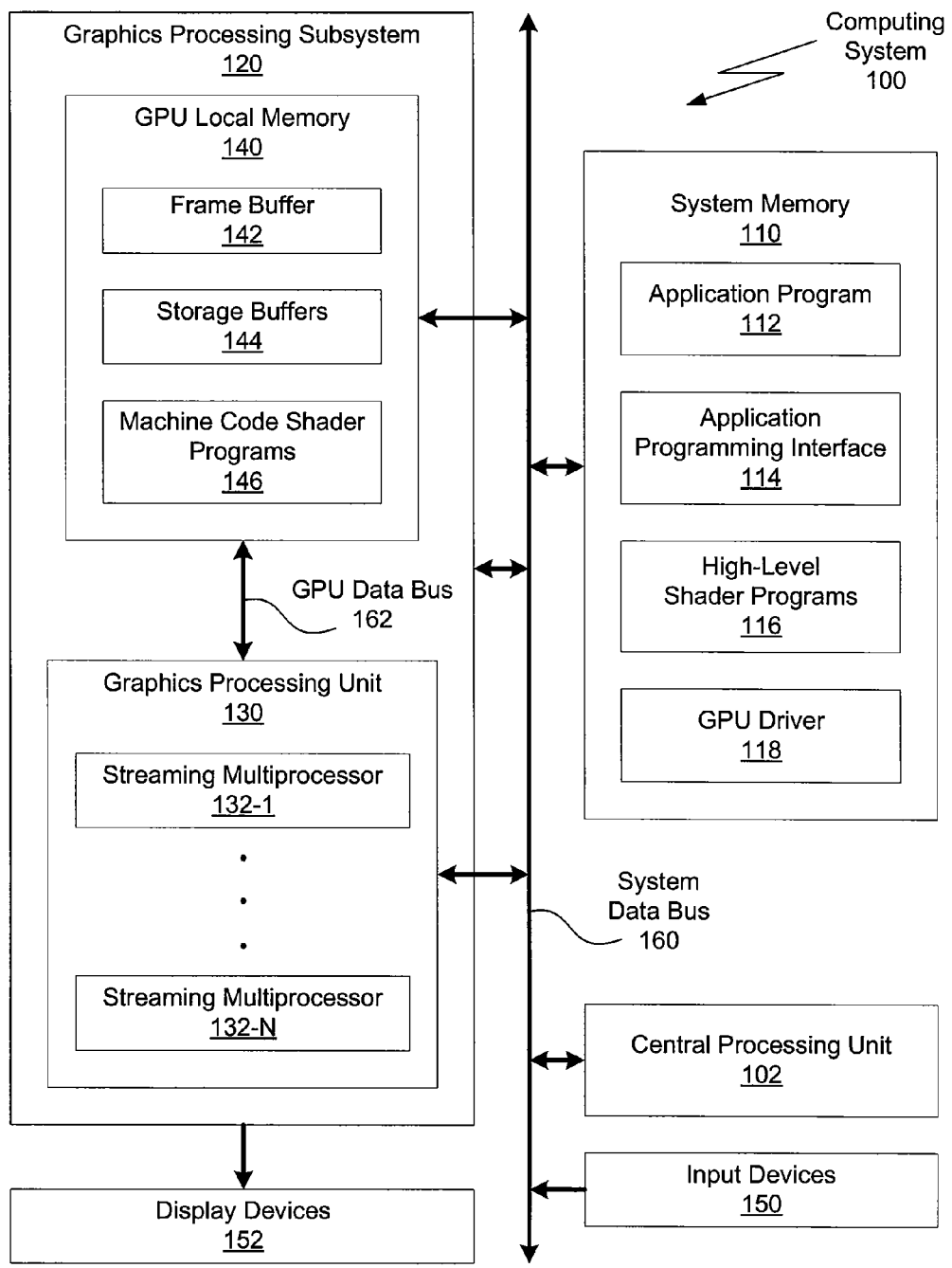
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a system data bus 160, a central processing unit (CPU) 102, input devices 150, a system memory 110, a graphics processing subsystem 120, and display devices 152. In alternate embodiments, the CPU 102, portions of the graphics processing subsystem 120, the system data bus 160, or any combination thereof, may be integrated into a single processing unit. Further, the functionality of the graphics processing subsystem 120 may be included in a chipset or in some other type of special purpose processing unit or co-processor.

The system data bus 160 connects the CPU 102, the input devices 150, the system memory 110, and the graphics processing subsystem 120. In alternate embodiments, the system memory 110 may connect directly to the CPU 102. The CPU 102 receives user input from the input devices 150, executes programming instructions stored in the system memory 110, operates on data stored in the system memory 110, and configures the graphics processing subsystem 120 to perform specific tasks in the graphics pipeline. For example, the CPU 102 may read a rendering method and corresponding textures from one or more files, and configure the graphics processing subsystem 120 to implement this rendering method. The system memory 110 typically includes dynamic random access memory (DRAM) used to store programming instructions and data for processing by the CPU 102 and the graphics processing subsystem 120. The graphics processing subsystem 120 receives instructions transmitted by the CPU 102 and processes the instructions in order to render and display graphics images on the display devices 152.

The system memory 110 includes an application program 112, an application programming interface (API) 114, high-level shader programs 116, and a graphics processing unit (GPU) driver 118. The application program 112 generates calls to the API 114 in order to produce a desired set of results, typically in the form of a sequence of graphics images. The application program 112 also transmits one or more high-level shading programs 116 to the API 114 for processing within the GPU driver 118. The high-level shading programs 116 are typically source code text of high-level programming instructions that are designed to operate on one or more shaders within the graphics processing subsystem 120. The API 114 functionality is typically implemented within the GPU driver 118. The GPU driver 118 is configured to translate the high-level shading programs 116 into machine code shading programs that are typically optimized for a specific type of shader (e.g., vertex, geometry, or fragment).

The graphics processing subsystem 120 includes a graphics processing unit (GPU) 130, a GPU local memory 140, and a GPU data bus 162. The GPU 130 is configured to communicate with the GPU local memory 140 via the GPU data bus 162. The GPU 130 may receive instructions transmitted by the CPU 102, process the instructions in order to render graphics data and images, and store these images in the GPU local memory 140. Subsequently, the GPU 130 may display certain graphics images stored in the GPU local memory 140 on the display devices 152.

The GPU 130 includes one or more streaming multiprocessors 132. Each of the streaming multiprocessors 132 is capable of executing a relatively large number of threads concurrently. Advantageously, each of the streaming multiprocessors 132 can be programmed to execute processing tasks relating to a wide variety of applications, including but not limited to linear and nonlinear data transforms, filtering of video and/or audio data, modeling operations (e.g. applying of physics to determine position, velocity, and other attributes of objects), and so on. Furthermore, each of the streaming multiprocessors 132 may be configured as one or more programmable shaders (e.g., vertex, geometry, or fragment) each executing a machine code shading program (i.e., a thread) to perform image rendering operations. The GPU 130 may be provided with any amount GPU local memory 140, including none, and may use GPU local memory 140 and system memory 110 in any combination for memory operations.

The GPU local memory 140 is configured to include machine code shader programs 146, storage buffers 144, and a frame buffer 142. The machine code shader programs 146 may be transmitted from the GPU driver 118 to the GPU local memory 140 via the system data bus 160. The machine code shader programs 146 may include a machine code vertex shading program, a machine code geometry shading program, a machine code fragment shading program, or any number of variations of each. The storage buffers 144 are typically used to store shading data, generated and used by the shading engines in the graphics pipeline. The frame buffer 142 stores data for at least one two-dimensional surface that may be used to drive the display devices 152. Furthermore, the frame buffer 142 may include more than one two-dimensional surface so that the GPU 130 can render to one two-dimensional surface while a second two-dimensional surface is used to drive the display devices 152.

The display devices 152 are one or more output devices capable of emitting a visual image corresponding to an input data signal. For example, a display device may be built using a cathode ray tube (CRT) monitor, a liquid crystal display, or any other suitable display system. The input data signals to the display devices 152 are typically generated by scanning out the contents of one or more frames of image data that is stored in the frame buffer 142.

Figure 2:
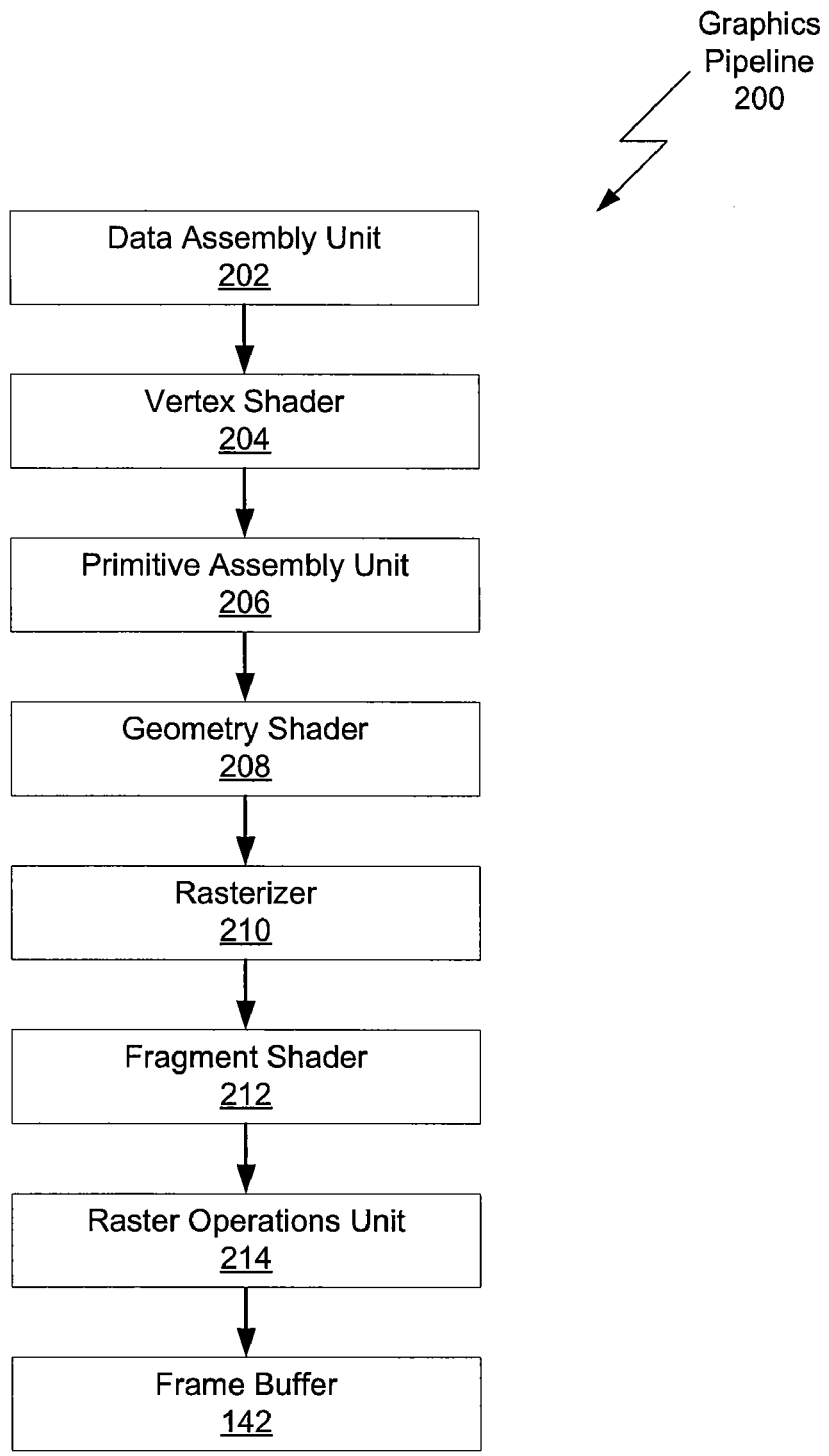
FIG. 2 is a conceptual diagram of a programmable graphics pipeline residing within the GPU of FIG. 1, according to one embodiment of the invention.

FIG. 2 is a conceptual diagram of a programmable graphics pipeline 200 residing within the GPU 130 of FIG. 1, according to one embodiment of the invention. The graphics pipeline 200 is configured to transform 3-D images into 2-D images. As shown, the graphics pipeline 200 includes a data assembly unit 202, a vertex shader 204, a primitive assembly unit 206, a geometry shader 208, a rasterizer 210, a fragment shader 212, a raster operations unit 214, and the frame buffer 142 of FIG. 1.

The data assembly unit 202 is a fixed-function unit that collects vertex data from the application program 112 for high-order surfaces, primitives, and the like, and passes the vertex data to the vertex shader 204. The data assembly unit 202 may gather data from buffers stored within system memory 110 and the GPU local memory 140 as well as from API calls from the application program 112 used to specify vertex attributes. The vertex shader 204 is a programmable execution unit that is configured to execute a machine code vertex shading program, processing vertex data as specified by the vertex shading program. For example, the vertex shader 204 may be programmed to perform skinning operations, transform the vertex data from an object-based coordinate representation (object space) to an alternatively based coordinate system such as world space or normalized device coordinates (NDC) space, or any combination thereof. The vertex processing unit 204 may access data that is stored in GPU local memory 140.

The primitive assembly unit 206 is a fixed-function unit that receives processed vertex data from vertex shader 204 and constructs primitives, e.g., points, lines, triangles, or the like, for processing by the geometry shading engine 208. The constructed primitives may include a series of one or more vertices, each of which may be shared amongst multiple primitives, and state information, such as a primitive identifier, defining the primitive. In alternative embodiments, a second primitive assembler (not shown) may be included subsequent to the geometry shader 208 in the data flow through the GPU 130.

The geometry shader 208 is a programmable execution unit that is configured to execute a machine code geometry shading program, processing primitives received from the primitive assembly unit 206 as specified by the geometry shading program. The geometry shader 208 may traverse the vertices of a given primitive, using the state information associated with the primitive to operate on those vertices. For example, the geometry shader 208 may be configured to traverse the vertices of an input primitive, using the state information of the primitive, to construct object-space to texture-space mappings and to transform the object-space view vector and light vectors of each vertex of the primitive to texture-space equivalents. In addition to well-known per-primitive operations such as clipping, the geometry shader 208 may be programmed to generate one or more new graphics primitives and calculate per-vertex parameters for generated vertices that are used when the new graphics primitives are rasterized. The geometry shader 208 may access data that is stored in the GPU local memory 140.

The geometry shader 208 outputs the parameters and primitives to the rasterizer 210. The rasterizer 210 is a fixed-function unit that scans the primitives and outputs fragments and coverage data to the fragment shader 212.

The fragment shader 212 is a programmable execution unit that is configured to execute a machine code fragment shading program, processing fragments received from rasterizer 210 as specified by the machine code fragment shading program. The fragment shader 212 may be programmed to perform operations such as bump mapping, perspective correction, shading, blending, and the like, to produce shaded fragments that are output to the raster operations unit 214. For example, the fragment shader 212 may use texture-space view vectors and light vectors in conjunction with a texture-space perturbed surface normal map to perform bump mapping calculations. The fragment shading engine 212 may access data that is stored in the GPU local memory 140. The raster operations unit 214 optionally performs fixed-function computations such as near and far plane clipping and raster operations, such as stencil, z test, blending and the like, and outputs pixel data as processed graphics data for storage in a buffer in the GPU local memory 140, such as the frame buffer 142.

Figure 3:
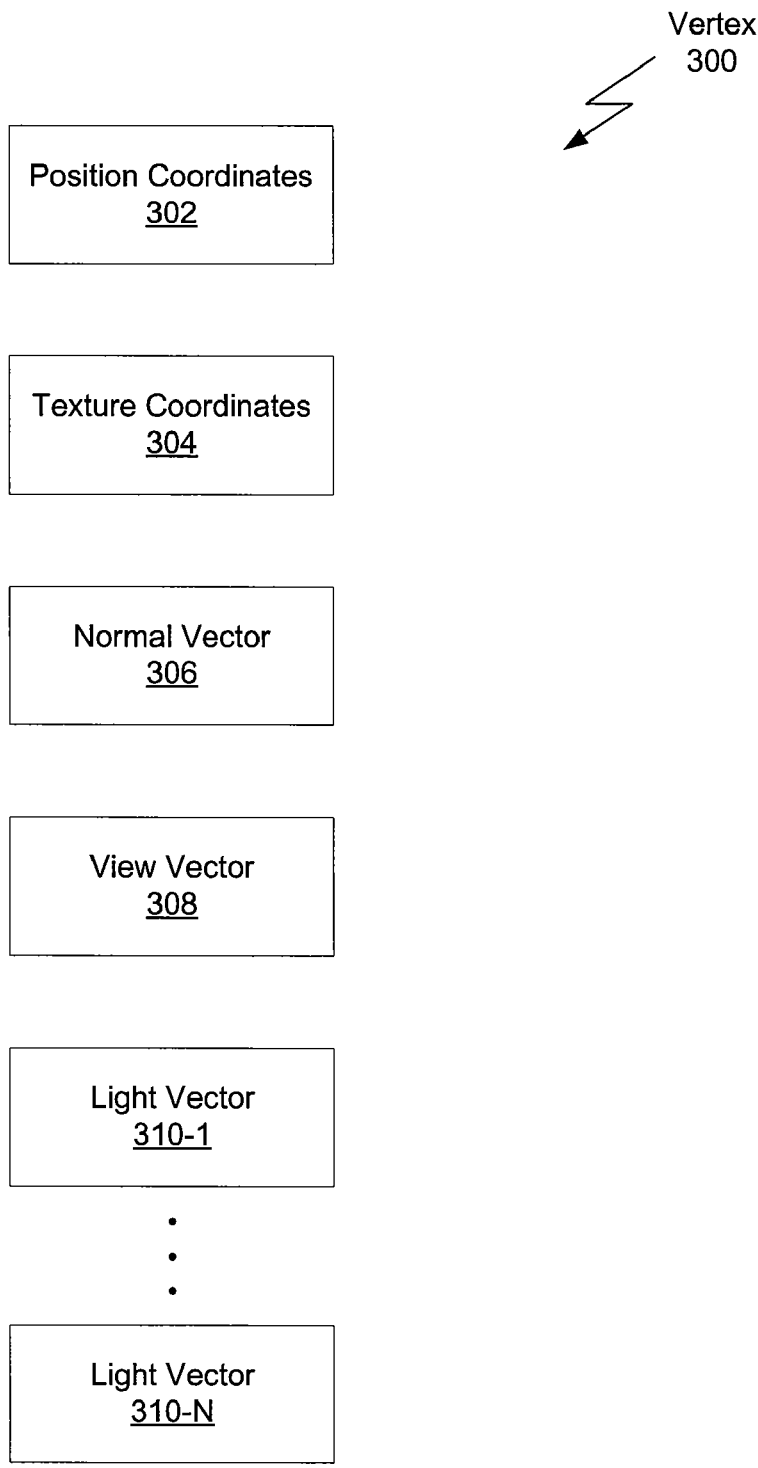
FIG. 3 is a conceptual diagram of a vertex, according to one embodiment of the invention.

FIG. 3 is a conceptual diagram of a vertex 300, according to one embodiment of the invention. The vertex 300 may be one of many vertices 300 flowing through the graphics pipeline 200 of FIG. 2. As shown, the vertex 300 may include position coordinates 302, texture coordinates 304, a normal vector 306, a view vector 308, and one or more light vectors 310.

The position coordinates 302 may be a three-component vector, e.g., (x, y, z), representing the position of the vertex 300 in object-space. The texture coordinates 304 may be a two-component vector, e.g., (s, t), representing the two-dimensional position of the corresponding texture data in a texture that is defined in texture-space. For example, the texture coordinates 304 may define the location of a perturbed surface normal in a perturbed surface normal map in texture-space. The normal vector 306 is a per-vertex normal. The vertex shader 206 of FIG. 2 may be configured to generate the normal vector 306 by calculating and normalizing the combination of the normals from multiple key frames or normal skinning transforms associated with the position coordinates 302. The view vector 308 may be a three-component directional vector that points from the vertex 300, represented by the positions coordinates 302, to the eye of a viewer. Similarly, each of the light vectors 310 may be a three-component directional vector that points from the vertex 300, represented by the positions coordinates 302, to a light source, such as the sun or a lamp.

Typically, the view vector 308 and the light vectors 310 are specified in object-space, consistent with the position coordinates 302. However, as discussed previously, to perform effective bump mapping, the view vector 308 and the light vectors 310 should share a consistent coordinate system with the perturbed surface normal map, which may be defined in texture-space. Accurately mapping these vectors from object-space to texture-space involves operating on the collection of vertices making up a given primitive. As set forth herein, the geometry shader 208 of FIG. 2 is advantageously optimized to operate on the collection of vertices and state information defining a particular primitive to efficiently transform the view vector 308 and the light vectors 310 from object-space to texture-space.

Figure 4:
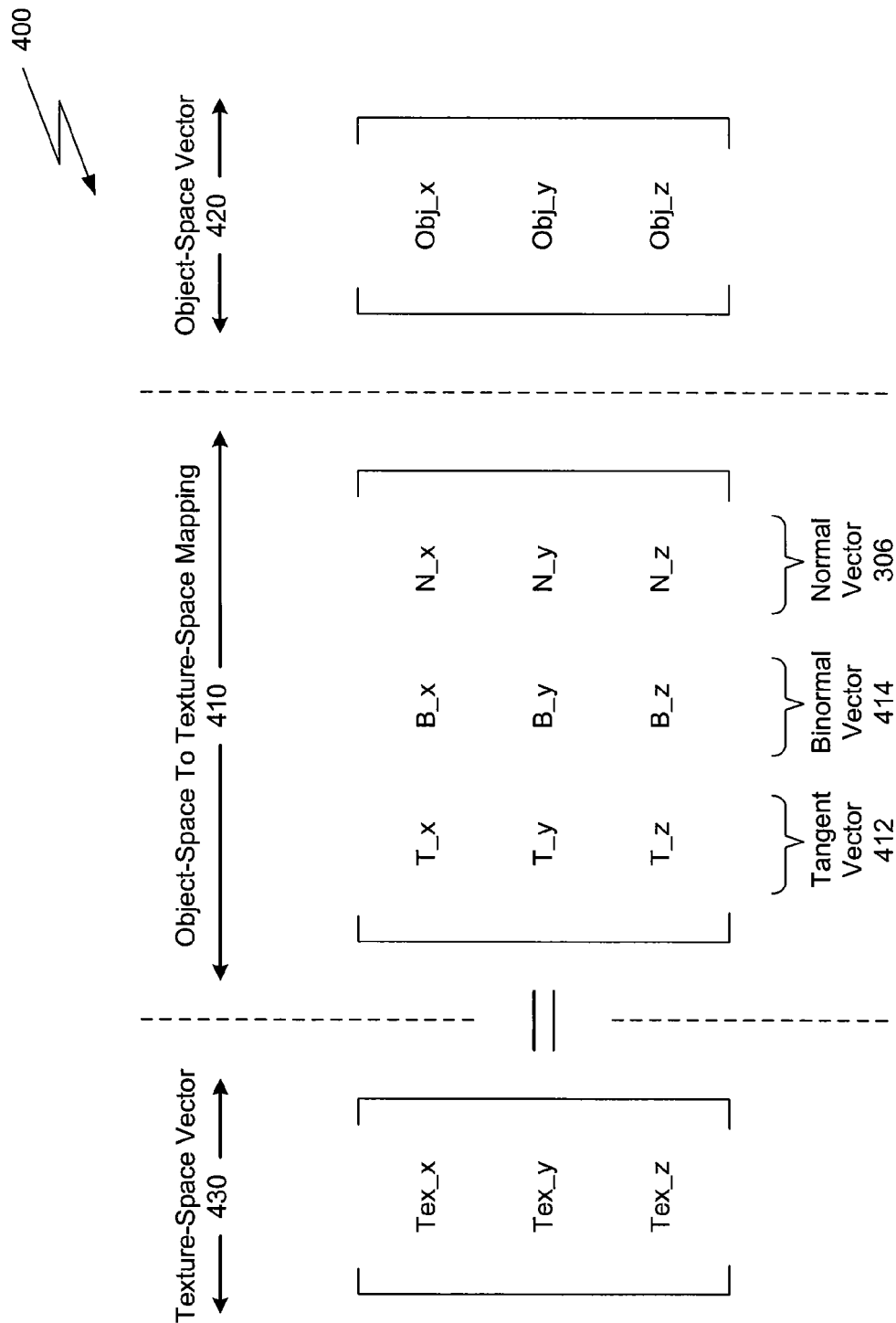
FIG. 4 is a conceptual diagram of an object-space to texture-space transformation, according to one embodiment of the invention.

FIG. 4 is a conceptual diagram of an object-space to texture-space transformation 400, according to one embodiment of the invention. As shown, the object-space to texture-space transformation 400 includes an object-space representation of a vector 420, a texture-space representation of the vector 430, and an object-space to texture-space mapping 410. The object-space representation of the vector 420 may be the object-specific three-dimensional coordinate system in which a given graphics object is defined. Similarly, the texture-space representation of the vector 430 may be the three-dimensional coordinate system in which a texture, such as a perturbed surface normal map, is defined. The object-space to texture-space mapping 410 may be a three-by-three orthonormal matrix, used to transform the view vectors and the light vectors associated with a given primitive and defined in the object-space to equivalent vectors in the texture-space via a matrix multiplication operation.

As shown, the object-space to texture-space mapping 410 includes three three-component vectors: the normal vector 306 of FIG. 3, a tangent vector 412, and a binormal vector 414. The tangent vector 412 represents how the object-space coordinates change with respect to one of the texture coordinates for a given primitive. As is well-known, the tangent vector 412 may be calculated using the position coordinates 302 and one of the texture coordinates 304 of the vertices 300 of a given primitive. The geometry shader 208 may be configured to calculate and normalize the tangent vector 412 in any technically feasible manner. As is also well-known, the binormal vector 314 is the cross-product of the normal vector 306 and the tangent vector 412. Furthermore, the normal vector 306, the tangent vector 412, and the binormal vector 414 may be assembled, as shown, into the object-space to texture-space mapping 410.

Although the tangent vector 412 may apply to all of the vertices that make up a given primitive, since the normal vector 306 may differ for each vertex 300 of a given primitive, the object-space to texture-space mapping 410 may also differ for each vertex 300 of a given primitive. The geometry shader 208 may be configured to iterate over each of the vertices 300 in a given primitive, calculating the binormal vector 414, creating the object-space to texture-space mapping 410, and using the object-space to texture-space mapping 410 to transform each of the view vectors and the light vectors associated with a particular vertex of a primitive (e.g., view vector 308 and light vectors 310 associated with vertex 300) from an object-space representation to a texture-space equivalent.

In alternative embodiments, a second tangent vector may be calculated using the second of the texture coordinates 304 to represent how the object-space coordinates change with respect to the second texture coordinate. This approach applies when per-vertex normals are not available or the underlying surface has a faceted appearance. An object-space to texture-space mapping may then be created using the tangent vector 412, the second tangent vector, and the cross-product of the tangent vector 412 and the second tangent vector. This object-space to texture-space mapping varies by primitive, but not by the vertices 300 within the primitive, and may be used to transform the view vector 308 and the light vectors 310 of each of the vertices 300 within the primitive from object-space to texture-space equivalents. Since only one mapping is calculated for each primitive, this approach may be quicker and eliminates the need to transfer and process per-vertex normals.

Figure 5:
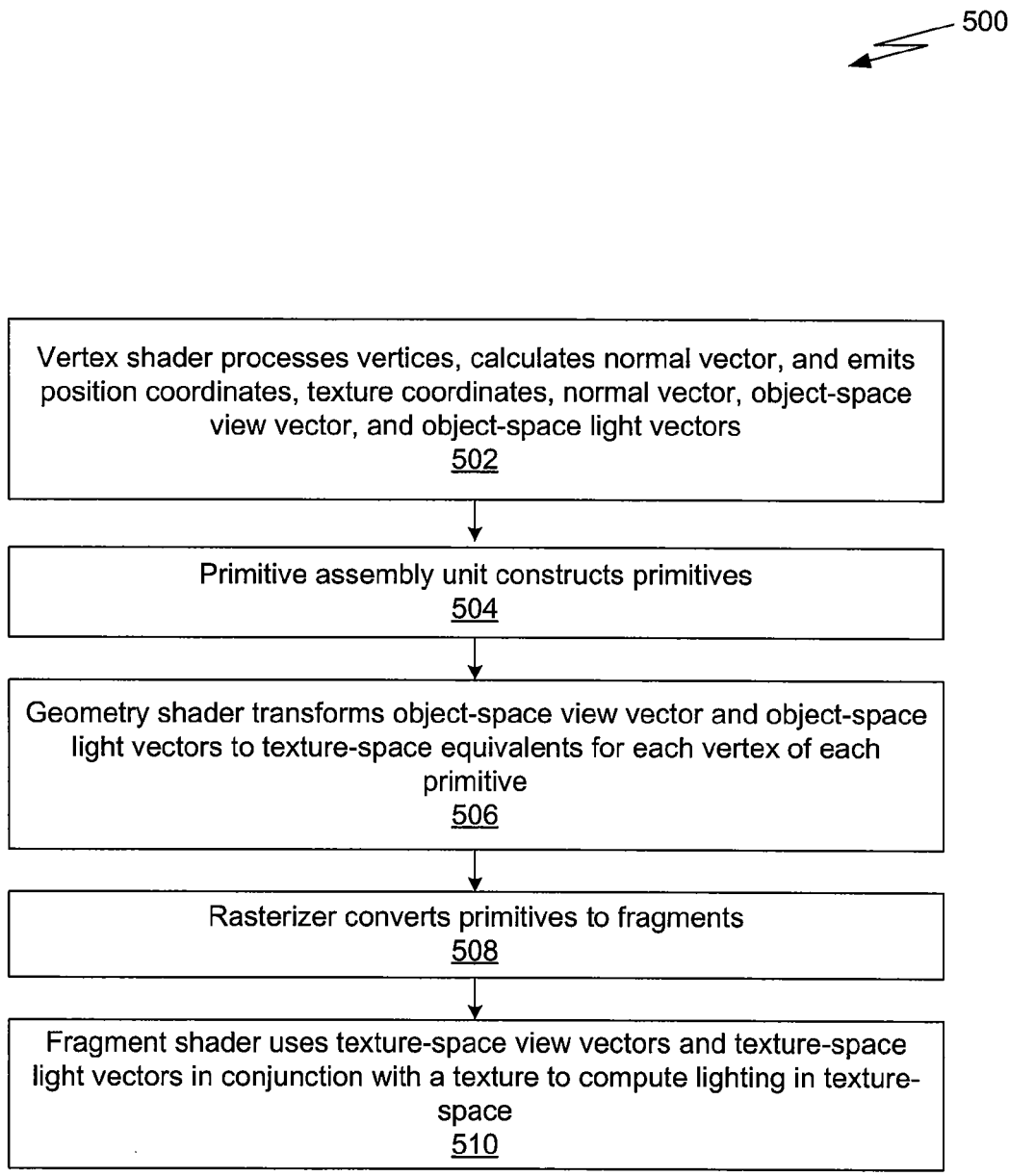
FIG. 5 is a flow diagram of method steps executed by the GPU of FIG. 1 to setup and perform bump mapping, according to one embodiment of the invention.

FIG. 5 is a flow diagram of method steps executed by the GPU 130 of FIG. 1 to setup and perform bump mapping, according to one embodiment of the invention. Although the method steps are described in conjunction with the systems for FIGS. 1-4, persons skilled in the art will understand that any system that performs the method steps, in any order, is within the scope of the invention.

As shown, the method 500 begins at step 502 where the vertex shader 204 processes vertices 300. During step 502, as discussed above in conjunction with FIG. 3, the vertex shader 204 calculates the position coordinates 302 and normal vector 306 in any technically feasible fashion. The vertex shader 204 then emits the position coordinates 302, the texture coordinates 304, the normal vector 306, the object-space view vector 308 (in object-space), and the light vectors 310 (also in object-space). In step 504, the primitive assembly unit 206 receives the vertices 300 and constructs primitives, such as triangles. Each primitive may include a series of one or more vertices 300 and primitive state information defining the primitive. Advantageously, a given vertex 300 may be shared by one or more of the primitives constructed by the primitive assembly unit 206 throughout the graphics pipeline 200. For example, a given vertex 300 may be shared by three triangles in a triangle strip without replicating any of the data, such as the normal vector 306, included in the vertex 300.

In step 506 the geometry shader 208 receives the primitives and performs bump mapping setup operations. Note that step 506 is described in greater detail below in conjunction with FIG. 6. The geometry shader 208 operates on each primitive, transforming the view vector 308 and the light vectors 310 of each vertex 300 of the given primitive from object-space representations to texture-space equivalents. During step 506, the geometry shader 208 emits the processed primitives, including the transformed vectors. In step 508, the rasterizer 210 converts the processed primitives to fragments. In step 510, the fragment shader 212 uses the texture-space representation of the view vector 308 and the texture-space representations of the light vectors 310, generated by the geometry shader 208 in step 506, in conjunction with a texture, such as a perturbed surface normal map, to perform lighting calculations in texture-space.

In addition to the light and view vectors, the lighting calculations could involve additional or alternative texture-space vectors such as tangent, reflection, or half-angle vectors. A person skilled in the art will recognize that the geometry shader 208 could transform any such vectors into texture-space.

Figure 6:
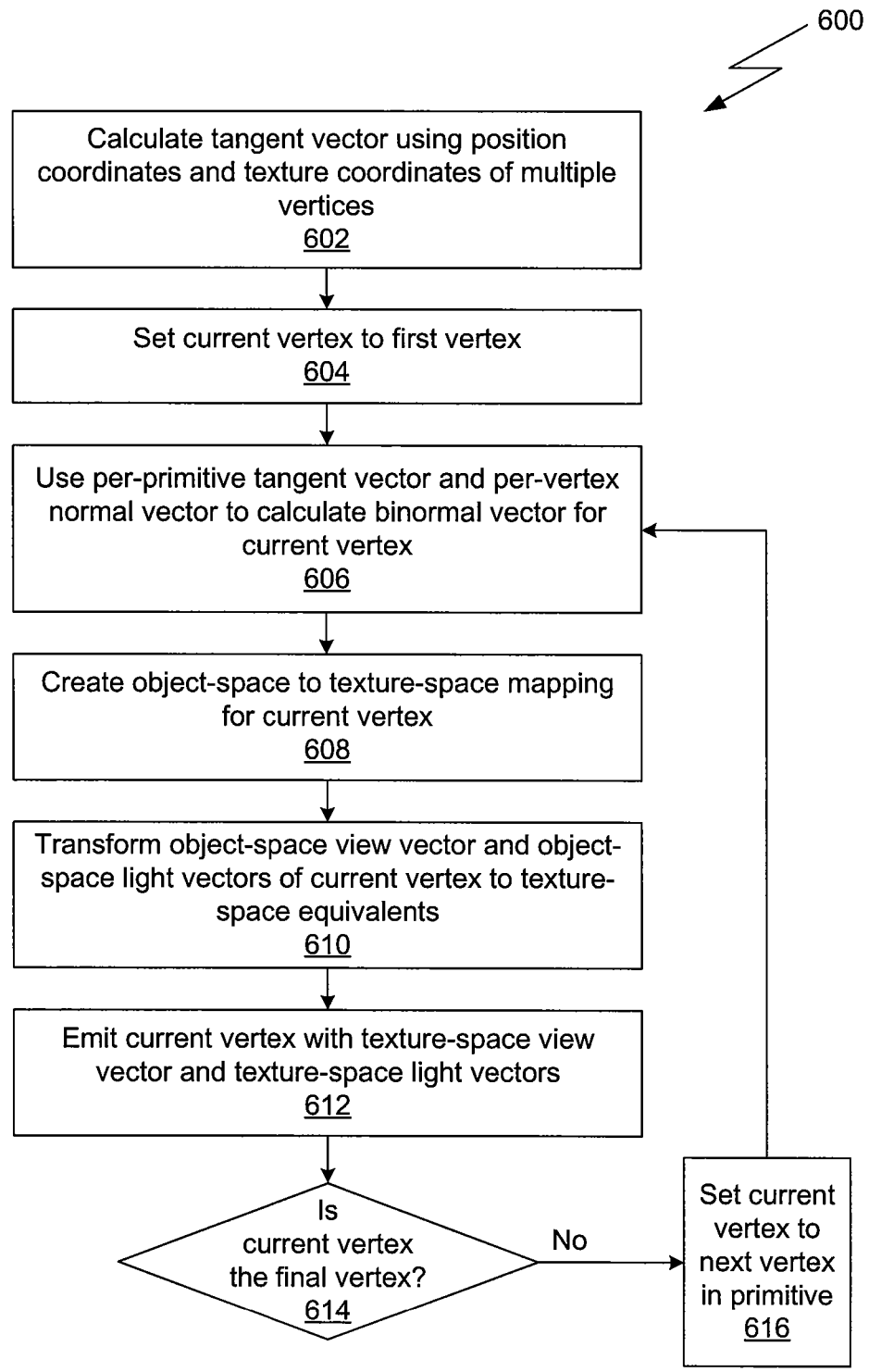
FIG. 6 is a flow diagram of method steps executed by the geometry shader of FIG. 2 when processing an input primitive to setup bump mapping, according to one embodiment of the invention.

FIG. 6 is a flow diagram of method steps executed by the geometry shader 208 of FIG. 2 when processing an input primitive to setup bump mapping, according to one embodiment of the invention. Although the method steps are described in conjunction with the systems for FIGS. 1-4, persons skilled in the art will understand that any system that performs the method steps, in any order, is within the scope of the invention.

As shown, the method 600 begins at step 602 where the geometry shader 208 receives an input primitive. In step 602, the geometry shader 208 uses the position coordinates 302 and the texture coordinates 304 of multiple vertices 300 in the primitive to calculate the tangent vector 412 representing how the object-space coordinates change with respect to one of the texture-space coordinates. The geometry shader 208 may perform this calculation in any technically feasible fashion. In step 604, the geometry shader 208 initializes a traversal of the vertices 300 in the primitive by setting a current vertex to a first vertex in the primitive. In step 606, the geometry shader 208 calculates the binormal vector 414 for the current vertex by computing the cross-product of the per-primitive tangent vector 412, calculated in step 602, and the per-vertex normal vector 306, calculated by the vertex shader 204 in step 502 of method 500. In step 608, the geometry shader 208 creates the object-space to texture-space mapping 410 for the current vertex by assembling the tangent vector 412, the binormal vector 414, and the normal vector 306 into a three-by-three matrix. In step 610, the geometry shader 208 iterates through each of the object-space view vector 308 and the object-space light vectors 310 associated with the current vertex. The geometry shader 208 multiplies the object-space to texture-space mapping 410 matrix created in step 608 by each of these vectors, thereby generating the texture-space representations of these vectors. In step 612, the geometry shader 208 emits the current vertex with the texture-space view vector and the texture-space light vectors calculated in step 610.

At step 614, if the geometry shader 208 determines that the current vertex is not the final vertex of the primitive (i.e., the geometry shader 208 has not yet iterated over all the vertices 300 in the primitive), then the method 600 proceeds to step 616. In step 616, the geometry shader 208 sets the current vertex to the next vertex in the primitive, and the method 600 returns to step 606, where the geometry shader 208 calculates the binormal vector 414 for the new current vertex. The method 600 continues in this fashion, looping through steps 606-616, until the geometry shader 208 has transformed all of the object-space view vectors 308 and the object-space light vectors 310 associated with all of the vertices 300 in the primitive to their texture-space equivalents. Then, the method 600 terminates and the geometry shader 208 may process another primitive.

In alternative embodiments, the geometry shader 208 may also be programmed to compensate for texture mirroring. As is well-known, texture mirroring is a technique which may be implemented to re-use textures. The step 602 of method 600, in which the geometry shader calculates the tangent vector 412, may be modified to identify and account for texture mirroring. For example, the geometry shader 208 may be configured to identify, in any technically feasible fashion, when texture mirroring is occurring using the position coordinates 302 and the texture coordinates 304 of multiple vertices 300 in the primitive. If the geometry shader 208 establishes that mirroring is occurring, then the geometry shader 208 negates the tangent vector 412, and the method 600 will continue to step 604 using the negated version of the tangent vector 412.

In sum, more efficient per-fragment lighting may be achieved by using a geometry shader to perform coordinate space transformations necessary for efficient texture-space lighting and bump mapping calculations. In one embodiment, a vertex shader generates vertex data, a primitive assembly unit constructs primitives, and a geometry shader performs coordinate space transformations on vectors in the primitives. The vertex shader processes vertices and emits vertex data, including a per-vertex normal vector. The primitive assembly unit receives the processed vertex data from the vertex shader and constructs primitives. Each primitive includes a series of one or more vertices, which may be shared amongst multiple primitives, and primitive state information. Upon receiving a primitive from the primitive assembly unit, the geometry shader uses the position coordinates and the texture coordinates of the vertices of the given primitive to calculate a tangent vector representing how the object-space coordinates change with respect to one of the texture-space coordinates. Then, for each vertex in the primitive, the geometry shader calculates an object-space to texture-space mapping using the normalized tangent vector and the per-vertex normal vector, and uses this mapping to transform the object-space view vector and the object-space light vectors of the vertex to texture-space equivalents.

Advantageously, using the geometry shader to perform coordinate space transformations for bump mapping setup is more efficient than using the CPU for such purposes. Furthermore, the disclosed approach implements the vertex shader for vertex shading operations, thereby more fully exploiting the processing efficiencies of the graphics rendering pipeline. Moreover, since bump mapping setup operations are executed completely by the GPU, there is no need to send data to the CPU, as with prior art approaches. And, since the geometry shader is configured to recognize individual primitives that share vertex data, there is no need for the primitive assembly unit to replicate vertex data when constructing the primitives.

While the foregoing is directed to embodiments of the present invention, other and further embodiments of the invention may be devised without departing from the basic scope thereof, and the scope thereof is determined by the claims.

I claim:

1. A geometry processing engine for processing primitives in a graphics rendering pipeline, the geometry processing unit configured to:
   receive vertex data related to each vertex of a primitive;
   compute a first vector based on at least a portion of the vertex data to generate an object-space to texture-space mapping for the primitive; and
   transform a second vector associated with one of the vertices of the primitive from an object-space representation to a texture-space representation by transforming the object space representation by the object-space to texture-space mapping.

2. The geometry processing engine of claim 1, wherein the vertex data includes texture coordinates associated with one or more of the vertices.

3. The geometry processing engine of claim 1, wherein the geometry processing engine is configured using a geometry shading program to compute the first vector and to transform the second vector.

4. The geometry processing engine of claim 1, wherein the first vector comprises a tangent vector associated with the primitive.

5. The geometry processing engine of claim 4, wherein the geometry processing engine is further configured to compute a bi-normal vector, based on the tangent vector and a normal vector, to generate the object-space to texture-space mapping represented as a matrix.

6. The geometry processing engine of claim 4, wherein the normal vector is computed by a vertex processing engine and comprises a combination of one or more normal vectors associated with one of the vertices of the primitive.

7. The geometry processing engine of claim 6, wherein the vertex processing engine configured using a vertex shading program to compute the normal vector and other vertex data.

8. The geometry processing engine of claim 4, wherein the geometry processing engine is configured to generate the object-space to texture-space mapping using a negative representation of the tangent vector to account for texture mirroring.

9. The geometry processing engine of claim 1, wherein the texture-space representation of the second vector is used in a bump mapping operation.

10. The geometry processing engine of claim 1, wherein the second vector is a light vector.

11. The geometry processing engine of claim 1, wherein the second vector is a view vector.

12. A graphics rendering pipeline included in a processing unit for processing primitives, the graphics rendering pipeline comprising:
a vertex processing engine configured to generate vertex data associated with each vertex of a primitive; and
a geometry processing engine configured to:
compute a first vector based on at least a portion of the vertex data to generate an object-space to texture-space mapping for the primitive, and
transform a second vector associated with one of the vertices of the primitive from an object-space representation to a texture-space representation by multiplying the object space representation by the object-space to texture-space mapping.

13. The graphics rendering pipeline of claim 12, wherein the vertex data includes texture coordinates associated with one or more of the vertices.

14. The graphics rendering pipeline of claim 12, wherein the geometry processing engine is configured using a geometry shading program to compute the first vector and to transform the second vector.

15. The graphics rendering pipeline of claim 12, wherein the first vector comprises a tangent vector associated with the primitive.

16. The graphics rendering pipeline of claim 15, wherein the vertex processing engine is configured to compute a normal vector comprising a combination of one or more normal vectors associated with one of the vertices of the primitive, and the geometry processing engine is further configured to compute a bi-normal vector, based on the tangent vector and the normal vector, to generate the object-space to texture-space mapping represented as a matrix.

17. The graphics rendering pipeline of claim 16, wherein the vertex processing engine configured using a vertex shading program to compute the normal vector and other vertex data.

18. The graphics rendering pipeline of claim 15, wherein the geometry processing engine is configured to generate the object-space to texture-space mapping matrix using a negative representation of the tangent vector to account for texture mirroring.

19. The graphics rendering pipeline of claim 12, wherein the second vector is a light vector or a view vector.

20. The graphics rendering pipeline of claim 12, the processing unit comprises a graphics processing unit.

21. A computing device, comprising:
a memory; and
a processing unit coupled to the memory and having a graphics rendering pipeline that includes:
a vertex processing engine configured to generate vertex data associated with each vertex of a primitive, and
a geometry processing engine configured to:
compute a first vector based on at least a portion of the vertex data to generate an object-space to texture-space mapping for the primitive, and
transform a second vector associated with one of the vertices of the primitive from an object-space representation to a texture-space representation by multiplying the object space representation by the object-space to texture-space mapping.

* * * * *